(No Model.)  P. AVERY.  2 Sheets—Sheet 1.
STANCHION.

No. 470,388.  Patented Mar. 8, 1892.

Witnesses  
Jas. K. McCathran  
N. J. Riley

By his Attorneys,  
C. A. Snow & Co.

Inventor  
Philander Avery (No Model.) 2 Sheets—Sheet 2.

P. AVERY.
STANCHION.

No. 470,388. Patented Mar. 8, 1892.

Witnesses
Jas. K. McCathran
H. F. Riley

Inventor
Philander Avery
By his Attorneys,
C. A. Snow & Co.

UNITED STATES PATENT OFFICE.

PHILANDER AVERY, OF INDUSTRY, ILLINOIS.

STANCHION.

SPECIFICATION forming part of Letters Patent No. 470,388, dated March 8, 1892.

Application filed May 29, 1891. Serial No. 394,565. (No model.)

*To all whom it may concern:*

Be it known that I, PHILANDER AVERY, a citizen of the United States, residing at Industry, in the county of McDonough and State of Illinois, have invented a new and useful Stanchion, of which the following is a specification.

This invention relates to improvements in stanchions.

The object of the present invention is to provide a simple and inexpensive stanchion adapted to be readily moved and capable of securely holding an animal in convenient position for dehorning, ringing, and other operations.

A further object of the invention is to enable the platform or floor of the stanchion to be adjusted to serve as a skid for loading vehicles with animals.

The invention consists in the construction and novel combination and arrangement of parts hereinafter fully described, illustrated in the accompanying drawings, and pointed out in the claims hereto appended.

Figure 1:
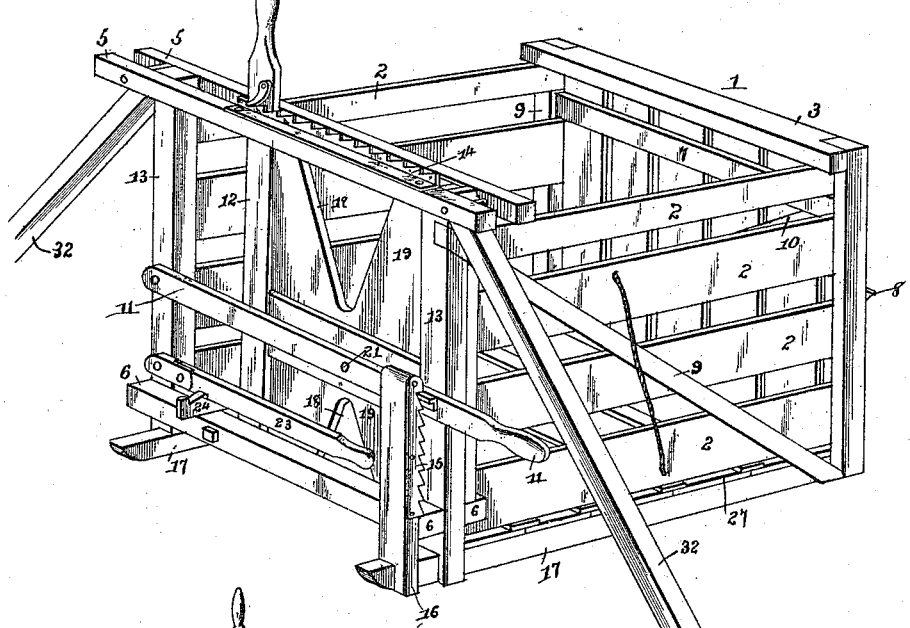
Figure 2:
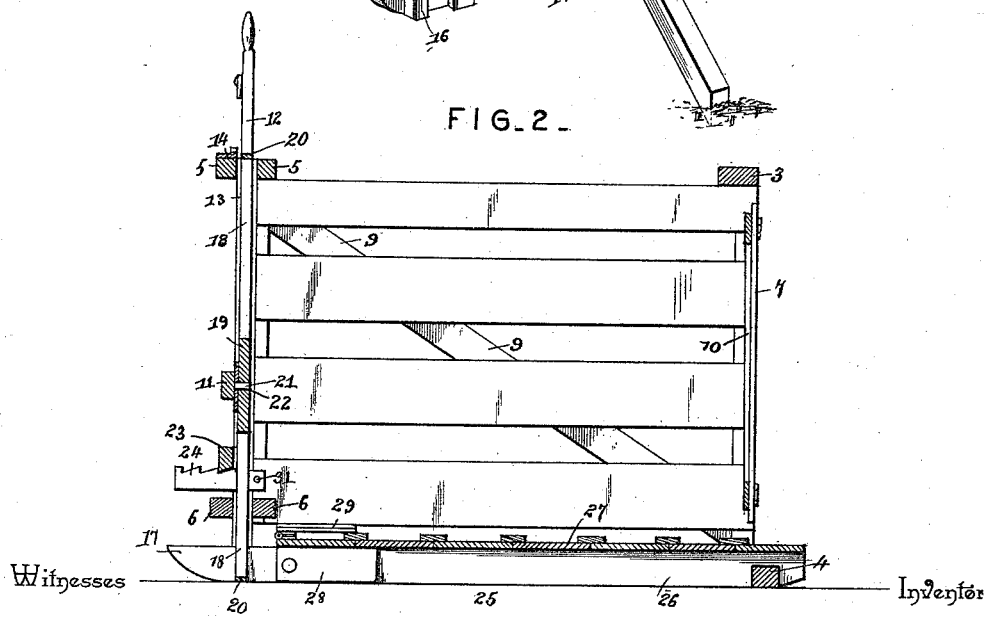
Figure 3:
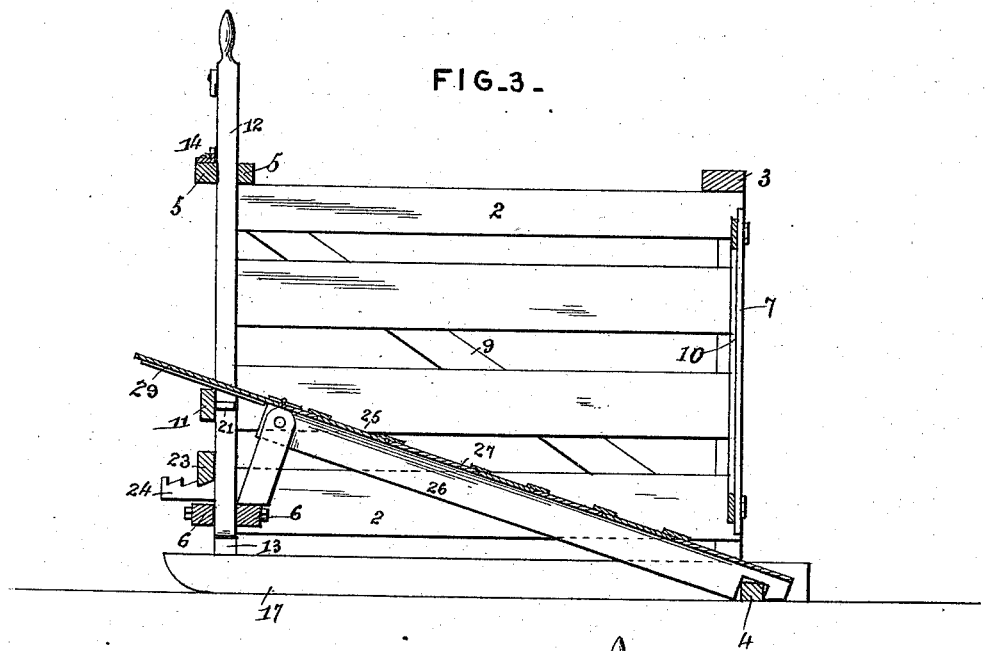
Figure 4:
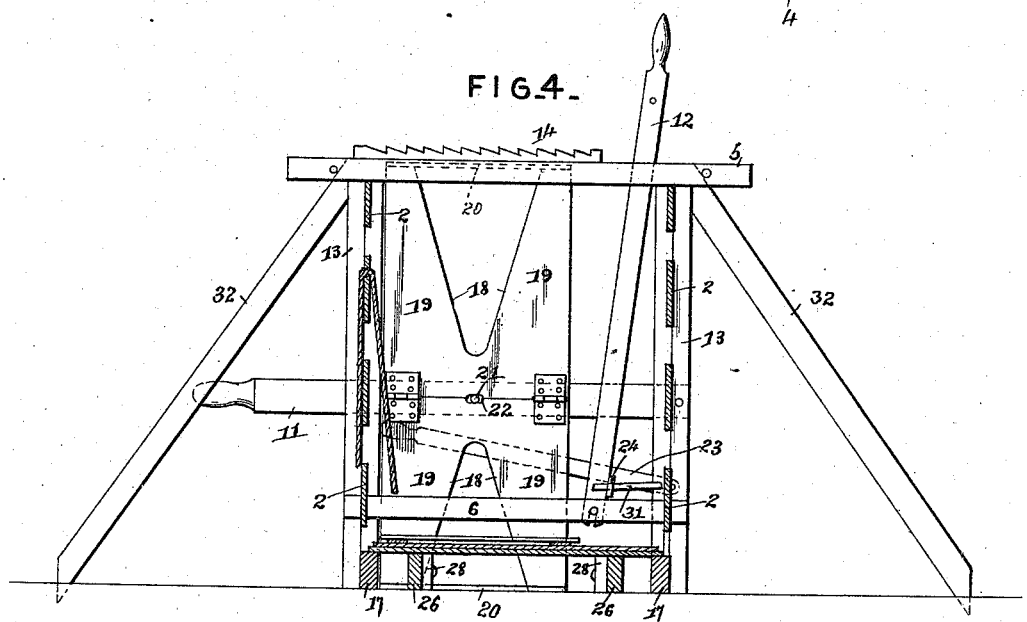

In the drawings hereto annexed, Figure 1 is a perspective view of a stanchion constructed in accordance with this invention. Fig. 2 is a vertical longitudinal sectional view, the stanchion being arranged for operating on hogs. Fig. 3 is a similar view, the floor or platform being arranged to form a skid. Fig. 4 is a vertical transverse sectional view, the parts being in position, as illustrated in Fig. 2.

Referring to the accompanying drawings, 1 designates a stanchion consisting of sides 2, which are connected by top and bottom rear transverse bars 3 and 4 and top and bottom front guide-bars 5 and 6 and a gate 7, arranged to close the back of the stanchion and hinged to one side and adapted to close against the other and be secured by a latch 8. The sides 2 and the gate 7 are composed of horizontal slats or rails, vertical bars, and inclined braces 9 and 10. The front of the stanchion is open, and arranged across the same is a horizontal lever 11 and a vertical lever 12, adapted to engage the neck of the animal to confine the latter. The vertical lever 12 is arranged between the guide-bars 5 and 6 and has its lower end fulcrumed between the latter near one side of the frame and the horizontal lever 11 has one end fulcrumed to the front bars 13 of the side adjacent the lever 12. The vertical lever 12 first engages the neck of an animal, and it is secured in its adjustment by a ratchet-bar 14. The horizontal lever 11 then forces the head of the animal down upon the bottom guide-bars and it is secured by a vertical ratchet-plate 15, which is secured on the outer side face of a post 16, arranged adjacent to one of the front bars 13 and forming with the same a way for the free end of the lever 11 and secured to the outer lower guide-bar and to the projecting end of one of the bottom bars 17. By this arrangement an animal may be held in convenient position for dehorning, ringing, and other operations, and it will be seen that by holding the head of the animal in a low position there is no danger of straining should the animal fall and that it is impossible to choke the same.

Hogs are held in position for ringing by V-shaped openings 18 of sections 19, which have their inner adjacent ends hinged together and which are arranged between the guide-bars 5 and 6, and are adapted to be raised and lowered to contract and enlarge the V-shaped opening of the lower section to confine the head of a hog on the bottom guide-bar 6. One of the V-shaped openings of the sections is larger than the other, and the sections are adapted to be reversed to bring either opening at the bottom of the stanchion to confine large and small animals, and the forked portions of the sections are prevented spreading by tie-bars 20, secured to the ends of the sections. The sections are operated in their adjustment by the horizontal lever 11, which is provided with a pin 21, projecting from its inner face and arranged to engage a central slot 22, and the slot 22 permits a movement of the pin to compensate for the swinging of the lever, to prevent the sections binding while being raised and lowered. The lower section may be moved vertically to vary the size of the V-shaped openings to confine the necks of the hogs of different sizes without reversing. The upper section of the V-shaped opening engages the top of the neck and the head of the animal is immovably held. The nose of the animal is held in close to the guide-bars by a lever 23, which is fulcrumed on the bar 13 at one side of the frame and is arranged to engage a ratchet 24 of the vertical lever 12.

Animals while being operated upon are supported on a floor or platform 25, which is composed of longitudinal sills 26 and transverse boards 27, and it is supported on the rear lower guide-bar 6 and the lower transverse bar 4, and the rear ends of the sills are provided with recesses to receive the bar 4. When it is desired to load a vehicle with animals, the front of the platform is elevated, as illustrated in Fig. 3 of the accompanying drawings, and it is supported by legs 28, which are pivoted to the inner faces of the sills and are arranged to rest upon the rearmost one of the guide-bar 6, and the front platform is provided with a hinged folding section 29, which is adapted to span the space between the front edge of the platform or floor and the front of the stanchion and project beyond the stanchion and rest upon the bottom of the vehicle. After a hog has been operated upon the hinged sections 19 are raised by means of the horizontal lever until the cross-bar of the lower section is above the lower guide-bars and then the lower section is swung upward by means of a cord, which has one end secured to the lower hinged section and has its other end free, and it is arranged in a perforation of one of the horizontal rails or bars of the stanchion-frame. The ratchet-bar 24, which is secured to the vertical lever, projects inward beyond the lever and is provided with a perforation, in which is arranged a guide rod 31, which is secured to the inner face of the front bar 13 and is arranged a short distance above the lower guide-bar. The stanchion-frame is braced against longitudinal movement or wabbling by the inclined side braces 9, and it is prevented swinging laterally by braces 32, which have their ends beveled, and when operating upon hogs one of the bars may be placed vertically between the guide-bars to close the space between the vertical lever and the adjacent side of the frame of the stanchion to prevent the escape of small animals. The lower end of the lever 12 is bifurcated to receive the fulcruming-bolt, and when the platform is arranged for loading animals the vertical lever 12 may be disengaged from its fulcrum and be moved to the side of the frame opposite the skid to provide an unobstructed opening or passage for animals. When it is desired to move the stanchion, the platform or floor may be removed, thereby making the stanchion-frame sufficiently light to be readily carried by one man. In dehorning the head of an animal is held in such low position that the animal is not only secured against straining and choking should it fall, but the operator is enabled to stand in a position so that he will be directly over the head of the animal, thereby affording a full view of the head and plenty of room for operation.

Having thus described my invention, what I claim is—

1. The combination of the stanchion-frame provided with horizontal guide-bars, the vertical lever arranged between the guide-bars, the hinged sections arranged between the guide-bars and provided above and below with V-shaped openings, and the horizontal lever connected with the sections and operating the same, substantially as described.

2. The combination of the stanchion-frame provided with guide-bars, the vertical lever arranged between the guide-bars, the sections hinged together and provided with V-shaped openings above and below and arranged between the guide-bars and provided with tie-bars secured to their outer ends, the horizontal lever fulcrumed on the frame and connected with the hinged sections, and the operating-cord attached to the lower section to raise the same, substantially as described.

3. The combination of the stanchion-frame having its front end open, the platform, the pivoted legs arranged at the front of the platform and adapted to hold the same in an inclined position, and the folding section 29, hinged to the front of the platform and adapted to extend through the opening at the front of the frame to form a skid for loading animals into a vehicle, substantially as described.

In testimony that I claim the foregoing as my own I have hereto affixed my signature in presence of two witnesses.

PHILANDER AVERY.

Witnesses:
 ZAVAN A. AVERY,
 D. M. CREEL.